United States Patent
Biswas et al.

(10) Patent No.: US 9,412,021 B2
(45) Date of Patent: Aug. 9, 2016

(54) METHOD AND APPARATUS FOR CONTROLLING TRANSMISSION OF DATA BASED ON GAZE INTERACTION

(71) Applicant: Nokia Corporation, Espoo (FI)

(72) Inventors: Debmalya Biswas, Lausanne (CH); Matthew John Lawrenson, Espoo (FI); Julian Nolan, Pully (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 221 days.

(21) Appl. No.: 14/093,244

(22) Filed: Nov. 29, 2013

(65) Prior Publication Data

US 2015/0154445 A1 Jun. 4, 2015

(51) Int. Cl.
*G09G 5/00* (2006.01)
*G06K 9/00* (2006.01)
*G06F 3/14* (2006.01)

(52) U.S. Cl.
CPC .......... *G06K 9/00604* (2013.01); *G06F 3/1438* (2013.01)

(58) Field of Classification Search
CPC .... G06K 9/00604; G06K 9/00; G06F 3/1438; G06F 3/14
See application file for complete search history.

(56) References Cited

U.S. PATENT DOCUMENTS

| | | | |
|---|---|---|---|
| 6,437,758 B1 | 8/2002 | Nielsen et al. | |
| 7,106,204 B2 | 9/2006 | Pilu et al. | |
| 7,120,880 B1* | 10/2006 | Dryer et al. | 715/863 |
| 2004/0208496 A1 | 10/2004 | Pilu | |
| 2010/0007601 A1* | 1/2010 | Lashina et al. | 345/156 |
| 2012/0206268 A1 | 8/2012 | Morris | |
| 2012/0274736 A1 | 11/2012 | Robinson et al. | |
| 2012/0293394 A1 | 11/2012 | Lahcanski | |
| 2013/0124623 A1 | 5/2013 | Munter | |

FOREIGN PATENT DOCUMENTS

WO 01/61588 A1 8/2001

OTHER PUBLICATIONS

R. Stiefelhagen, "From Gaze to Focus of Attention", In: Huijsmans, D.P., Smeulders, A.W.M. (eds.) Visual 1999. LNCS. vol. 1614; 6 pages.

\* cited by examiner

*Primary Examiner* — Towfiq Elahi
(74) *Attorney, Agent, or Firm* — Ditthavong & Steiner, P.C.

(57) ABSTRACT

An approach for controlling transmission of data based on gaze interaction. A data transmission determination platform determines one or more gaze metrics for one or more users. The one or more gaze metrics, relate, at least in part, to a level of interaction of each user with an object. The data transmission determination platform then processes and/or facilitates a processing of the one or more gaze metrics, user preference information, propagation information from one or more entities associated with the object, or a combination thereof to determine data to transmit one or more devices associated with at least a subset of the at least one or more users.

12 Claims, 10 Drawing Sheets

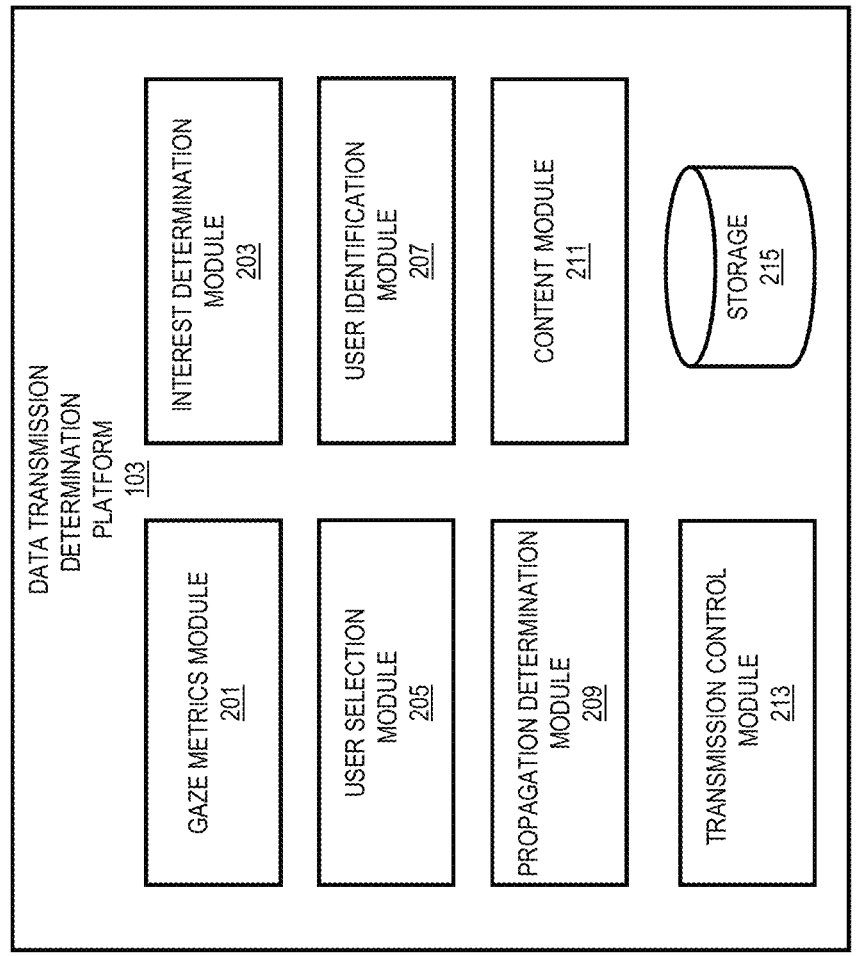

METHOD AND APPARATUS FOR CONTROLLING TRANSMISSION OF DATA BASED ON GAZE INTERACTION

BACKGROUND

Service providers and device manufacturers (e.g., wireless, cellular, etc.) are continually challenged to deliver relevant content to users. With widespread adoption of ubiquitous computing, the types of information that can be captured and shared along with the variety of sharing mediums are increasing rapidly. This can lead to inundating users with irrelevant information, for example, during an ad-hoc meeting (e.g., conferences, exhibitions, tradeshows, etc.). Often, information is disseminated to participants irrespective of the participant's interest. And after the information is disseminated, the sender cannot control the onward sharing of the information.

SOME EXAMPLE EMBODIMENTS

Therefore, there is a need for an approach for controlling transmission of data and onward transmissions of data based on gaze interaction.

According to one embodiment, a method comprises determining one or more gaze metrics for one or more users. The one or more gaze metrics, relate, at least in part, to a level of interaction of each user with an object. The method further comprises processing of the one or more gaze metrics for one or more users, user preference information for one or more users, propagation information from one or more entities associated with the object, or a combination thereof to determine data to transmit to one or more devices associated with at least a subset of the at least one or more users.

According to another embodiment, an apparatus comprises at least one processor, and at least one memory including computer program code for one or more computer programs, the at least one memory and the computer program code configured to, with the at least one processor, cause, at least in part, the apparatus to determine one or more gaze metrics for one or more users. The one or more gaze metrics, relate, at least in part, to a level of interaction of each user with an object. The apparatus is further caused to process the one or more gaze metrics for one or more users, user preference information for one or more users, propagation information from one or more entities associated with the object, or a combination thereof to determine data to transmit to one or more devices associated with at least a subset of the at least one or more users.

According to another embodiment, a computer-readable storage medium carries one or more sequences of one or more instructions which, when executed by one or more processors, cause, at least in part, an apparatus to determine one or more gaze metrics for one or more users. The one or more gaze metrics, relate, at least in part, to a level of interaction of each user with an object. The apparatus is further caused to process the one or more gaze metrics for one or more users, user preference information for one or more users, propagation information from one or more entities associated with the object, or a combination thereof to determine data to transmit to one or more devices associated with at least a subset of the at least one or more users.

According to another embodiment, an apparatus comprises means for determining one or more gaze metrics for one or more users. The one or more gaze metrics, relate, at least in part, to a level of interaction of each user with an object. The apparatus further comprises means for processing and/or facilitating a processing of the one or more gaze metrics for one or more users, user preference information for one or more users, propagation information from one or more entities associated with the object, or a combination thereof to determine data to transmit to one or more devices associated with at least a subset of the at least one or more users.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of the components of the data transmission determination platform according to one embodiment;

DESCRIPTION OF SOME EMBODIMENTS

Examples of a method, apparatus, and computer program for controlling transmission of data based on gaze interaction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
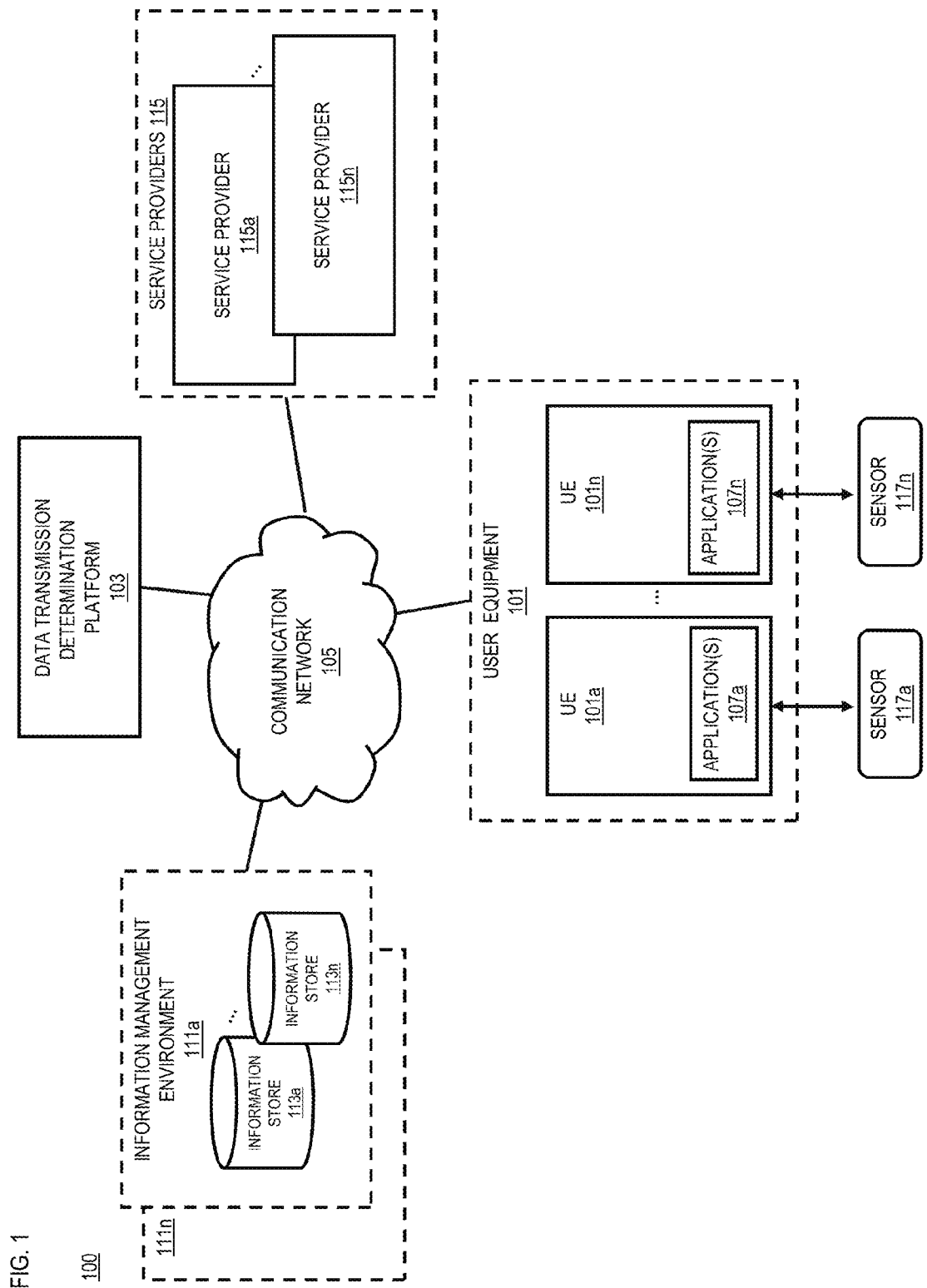
FIG. 1 is a diagram of a system capable of controlling transmission of data based on gaze interaction, according to one embodiment.

FIG. 1 is a diagram of a system capable of controlling transmission of data to one or more devices based on gaze interaction, according to one embodiment. For example, at ad-hoc meetings, a diverse range of content can be presented (for example, by different speakers at the conference, different booths in an exhibition, and the like). However, data is often generally and randomly shared among all users attending the ad-hoc meetings irrespective of the user's interest in specific content.

To address this problem, a system 100 of FIG. 1 introduces the capability to provide controls for a transmission of data to one or more user's devices based on gaze interaction. The transmission of the data can be controlled in at least in part based on the user's (e.g., an attendee of an ad-hoc meeting) interest level in an object. The interest level can be determined, based on at least, in part on one or more gaze metrics.

In one embodiment, the system 100 determines to transmit data to one or more devices associated with a user based on one or more gaze metrics of the user, user preference information, and/or propagation information. As used herein, the term "gaze metric" refers to one or more metrics related to a level of interaction of an individual with an object. Gaze metrics includes one or more metrics associated with eye movement(s) of a user that can be used to quantitatively and/or positively determine gaze contact of the user with respect to an object. One or more gaze metrics can include but is not limited to gaze duration or fixation, fixation location, frequency, gaze direction, pupil dilation, intensity, saccades, blinks, among others, or a combination thereof.

An "object" refers to any thing, person, or matter with respect to one or more gaze metrics can be determined. Examples of an object can include but is not limited to a region of a presentation displayed on a monitor or a projection screen, an individual (e.g., a eyes of an presenter), a device or interface (e.g., a display, projection screen, wearable interface, etc.), physical medium (e.g., vendor stand, an art gallery or museum installation, billboard, window display, etc.), among others, or any combination thereof. The object can be associated with one or more entities (e.g., person, vendor, a department, team, a business, a corporation, etc.). For example, a presenter or a company associated with the presenter may want to transmit a presentation to those attendees that have made sufficient eye contact with either the presentation and/or the presenter. The determination of eye contact may be based on at least in part the one or more gaze metrics of the participants.

In one embodiment, the system 100 may determine to transmit data to a user if the one or more gaze metrics meets or exceeds an interest threshold. The system 100, for instance, can statistically profile one or more the gaze metrics to determine a level of interest or interest score that can be used for a comparison to the interest threshold. For example, in a case where duration of gaze fixation is used as a gaze metric, a gaze fixation duration ranging under 2 seconds may indicate a no/low interest score, between 2 seconds and 5 seconds may indicate a medium interest score, and over 5 seconds may indicate a high interest score. It is contemplated that the system 100 may use any form of gaze metric including the examples of gaze metrics described above. In this way, specific data corresponding to the object of a user's gaze can be transmitted to the users having a specified amount of interest in the object. In some embodiments, temporal considerations or other contextual information (e.g., location, topic of discussion parsed from speech recognition information, etc.) may be used to determine what data to transmit. For example, if a user's gaze metric with respect to a speaker (e.g., an object of interest) exceeds an interest threshold while the speaker is discussing a certain topic, data related to that particular topic may be sent to the user.

The interest threshold may correspond to a value for one or more of the gaze metrics, an interest level, an interest score, or a combination thereof. For example, in the example above, the interest threshold for transmission of data may correspond to a gaze fixation for at least 5 seconds and/or a high interest score.

In one embodiment, the system 100 can process the one or more gaze metrics, propagation information, user preference information, or a combination thereof to determine data to present to one or more user devices. As used herein, the term "data" refer to multimedia content that can be provided in document, file, token, etc. and that can be transmitted and/or shared among users. The data may include music, informational brochures, or presentations, among others. By way of example, the content (or amount) of information provided in the data and/or method of transmission (e.g., text, email, alert, etc.) may vary depending on the user's profile information and/or propagation information.

For instance, the propagation information, user preference information, or a combination thereof may include one or more interest thresholds to determine a certain level of interest or interest score required for receiving data. For example, in a case where both the propagation information and user preference information both include an interest threshold, the interest threshold provided by the propagation information may be used as a primary filter and the interest threshold provided by the user preference information may be used as a secondary filter. For example, if the system 100 determines that the user's gaze metric(s) with respect to a speaker exceeds an interest threshold provided by the propagation information, the system 100 may compare the user's gaze metric(s) to the interest threshold provided by the user preference information to determine whether the level of interest or interest score is met before data related to that particular topic may be transmitted to the user. In this way, the user can control the data received and is thereby provided with additional level of protection against untrustworthy entities.

In one embodiment, the propagation information can include conditions related to transmissions of data and the content of the data to be transmitted based on the met conditions. Propagation information, for instance, can include one or more conditions associated with contextual information (e.g., location information with respect to the object and/or transmitter; a user and/or entity; temporal information, etc.); user profile information (e.g., behavioral tendencies, number of contacts, interests, residence, income); registration information (e.g., registered attendees of a meeting); one or more gaze metrics (e.g., an interest threshold); among others; or a combination thereof. The propagation information, for instance, can be provided by the speaker of the presentation (an entity). One or more conditions associated with propagation information may also be associated with default values In one embodiment, the system 100 may process the propagation information to determine conditions for transmission of data to a user, as well as conditions for further transmissions of the data by the user. In some embodiments, the system 100 can use in conjunction with one or more gaze metrics (e.g., interest level), one or more other conditions associated with the propagation information as additional filters for transmission of data and/or data content. For example, in a case where the user exceeded the interest level, the system 100 may compare information associated with the user to the one or more other conditions associated with the propagation to determine whether and what to transmit. For example, if a user's gaze metric with respect to an individual at a vendor stand advertising different car models, the system 100 may compare the user profile information, such as residence and income information, with the conditions provided by the propagation information to determine the data to transmit so that the user may receive only information about the models that is capable of buying and purchasing (e.g., models available in his residence country. In this way, the system 100 can determine data relevant to the user based on the information available about the user.

In one embodiment, the system 100 can control further transmission of the data using the propagation information. In some embodiments, the propagation information may be different between an initial transmission to the user and further transmissions by the user. For example, after receiving the data regarding the presentation or the car (in the example above), a user may only be able to transmit data to another user with whom he/she has gaze contact. In another example, the user may only be able to transmit the data to other users attending the meeting, with whom they had gaze contact and/or have a similar profile (e.g., received similar type of content, such as comparable car information).

In this way, the speed at which information can be disseminated over a geographical region and/or population can be controlled. By requiring gaze contact, the speed of information propagation may be slowed even without the location restriction. For example, at a product launch event, the system 100 may share data with journalists attending the event and with whom the presenter had gaze contact. The journalists can further propagate the shared specs to other journalists, but only to those physically present at the event venue. Additionally, for instance, for sensitive content, such as product launch, control can be retained over the onward propagation of content after an initial transmission.

For example, by imposing the one or more conditions can ensure that the spread of information would be much slower than that e.g. can be achieved by a mass/bulk email. It can lead to an incremental propagation model, where in the first stage, information can only be propagated to users physically present at the conference/meeting venue. In the second stage, sharing can occur with office colleagues of the attendees, and so on. This can be very desirable characteristic for cases where there might be a need to perform a phased release of information to prevent leaks (e.g., product launches).

The user preference information, for instance, may include an interest threshold associated with one or more gaze metrics, interest score, and/or interest level, the one or more user devices to which the system 100 should transmit data, among others, the one or more mediums (e.g., text, email, etc.) to which the system 100 should transmit data to the one or more user devices, or a combination thereof. The user preference information may be associated with an identifier of the user (e.g., a name and/or picture). In this way, the user can control the data received and transmissions. For example, in a case where the user exceeded the interest level, the system 100 may identify the user to determine the associated user preference information. In one embodiment, the system 100 may identify the user using facial recognition software and determine the user preference information based on that identification.

As shown in FIG. 1, the system 100 comprises a user equipment (UE) 101 having connectivity to a data transmission determination platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include or have access to one or more applications 107a-107n (collectively referred to as applications 107). The applications 107 may be any type of application that can be executed on the UE 101. The applications 107 may include client programs (e.g., navigation applications, calendar applications, Internet browsing applications, contact applications, etc.), services, or the like that may utilize the data transmission determination platform 103, the information management environment 111a-111n (collectively referred to as information management environment 111), or other services, applications, content, etc. available over the communication network 105.

In one embodiment, the functions of the data transmission determination platform 103 may be embodied or performed by one or more of the applications 107. In one embodiment, the data transmission determination platform 107 may interface with one or more of the applications 107 on the UE 101 to perform one or more functions described herein.

In one embodiment, the UE 101 may include or be associated with one or more sensors 117a-117n (collectively referred to as sensors 117). The sensors 117 may include any type of sensor capable of tracking eye movement of a user with respect to an object, capturing an image of a user and/or object, among others. In one embodiment, the sensors 117 may be one or more image sensors, such as one or more still image and/or video sensors that may acquire visual information and transform the visual information into data that may be processed by the UE 101 and/or the data transmission determination platform 103. An example of one or more sensors 117a-117n may include a front-facing camera. By way of example, one or more sensors 117a-117n may be provided on a wearable interface, such as specialized glasses, presentation display device, personal mobile device, among others, or a combination thereof.

In one embodiment, the data transmission determination platform 103 may determine one or more gaze metrics with respect to an object based on at least the data provided by the one or more sensors 117a-117n. In some embodiments, the data transmission determination platform 103 may determine one or more gaze metrics relative to position information collected from the UE 101. In some embodiments, the position information may include the position of the user with respect to a geographical location (e.g., a room), the relative information of the sensors 117 and object, or a combination thereof. For example, for meetings (e.g., video conference) in which users are remotely attending, the data transmission determination platform 103 can correlate the position information with the sensor data (e.g., video feed) to determine the one or more gaze metrics associated with the user. In this way, one or more gaze metrics of users remotely attending a presentation or meeting (e.g., a video conference) can be more accurately determined.

In one embodiment, the information management environment 111 can include one or more information stores 113a-113n (collectively referred to as information stores 113). The information stores 113 may contain the propagation information, the user preference information, content associated with the data to be transmitted, registration information, among others, or a combination thereof. In some embodiments, the information contained on the information stores 113 can be stored on a local storage on UEs 101a-101n, on a storage of the data transmission determination platform 103, on the information management environments 111, or a combination thereof.

The system 100 may include one or more service providers 115. The service providers 115 may provide one or more services to the UE 101, the data transmission determination platform 103, or any other element of the system 100. The service providers 115 may provide any type of service, such as one or more social networking service, one or more navigational service, one or more recommendation service, etc. In one embodiment, the functions of the data transmission determination platform 103 may be embodied or performed by one or more of the service providers 115.

In one embodiment, the data transmission determination platform 103 may determine to transmit data based on various factors such as, for example, one or more gaze metrics of the user, user preference information associated with users of UEs 101a-101n, propagation information, among others, or a combination thereof. It is noted that the one or more gaze metrics can be stored on a local storage on UEs 101a-101n, on a storage on the data transmission determination platform 103, on the information management environments 111a-111n, or a combination thereof.

In one embodiment, the data transmission determination platform 103 may determine propagation information associated with the object. The data transmission determination platform 103 may use the propagation information to determine the initial transmission, as well as control further transmissions by the receiving user by imposing conditions on further propagations.

By way of example, the UE 101, the data transmission determination platform 103, information management environment 111, and service providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 2 is a diagram of the components of the data transmission determination platform 103, according to one embodiment. By way of example, the data transmission determination platform 103 includes one or more components for controlling transmission of data based on gaze interaction. It is contemplated that the functions of these components may be combined in one or more components or performed by other components of equivalent functionality. In this embodiment, the data transmission determination platform 103 includes a gaze metrics module 201, an interest determination module 203, a user selection module 205, a user identification module 207, a propagation determination module 209, a content module 211, a transmission control module 213, and a storage 215.

In one embodiment, the gaze metrics module 201 may determine the one or more gaze metrics associated with one or more users with respect to an object. The gaze metrics module 201 may acquire gaze tracking information from one or more of the sensors 117 associated with the UE 101. By way of example, the UE 101 may be associated with a sensor 117, such as a front facing camera, that is able to track the eye movements of one or more users with respect to an object. The UE 101 may also be associated with a sensor 117 that is a specialized sensor provided on a wearable interface (e.g., such as specialized glasses). Based on at least the gaze tracking information, the gaze metrics module 201 may determine one or more gaze metrics associated with a user.

In some embodiments, the gaze metrics module 201 may acquire position information of a user collected from the UE 101. The gaze metrics module 201 may communicate with the UE 101 of a user to acquire contextual information associated with the location of the user, for example, to determine position information of the user with respect to the object. The position information, for instance, may include a position of the user in a room and/or position of a user relative to a position of a camera and video conference display device. By way of example, the UE 101 of users attending a meeting remotely (e.g., video conference) may communicate with the UE 101 of the presenter. The gaze metrics module may correlate the position information with the user's video feed to determine one or more gaze metrics associated with the one or more users.

In one embodiment, based on the one or more gaze metrics, the interest determination module 203 may determine level of interest and/or interest score of the one or more users with the object. In some embodiments, the interest determination module 203 may quantitatively analyze the one or more gaze metrics, for example, by statistically profiling the one or more gaze metrics, to determine a level of interest and/or an interest score. The interest score may reflect the level of interest in an object by a user. For example, a user who has a high interest score (e.g., a gaze over 5 seconds) may be considered a "highly interested" user. For example, in a case where gaze duration of fixation is used as a gaze metric, the interest determination module 203 may correlate gaze fixation durations with interest level and/or scores. For instance, a gaze fixation duration ranging under 2 seconds may indicate a no/low interest score, between 2 seconds and 5 seconds may indicate a medium interest score, and over 5 seconds may indicate a high interest score.

In one embodiment, the user selection module 205 determines a subset of one or more users interested in the object based on a comparison of the one more gaze metrics to an interest threshold. In some embodiments, the user selection module 205 may select users with a certain level of interest and/or interest score. In some embodiments, the user selection module 205 may have to verify the one or more gaze metrics and/or interest score associated with a user. By way of example, the user selection module 205 may have to provide proof of an "interested user" for confirmation before the user identification module 207 may access user preference and/or user profile information.

In some embodiments, the user selection module 205 may further filter the subset of one or more users considered to be interested by comparing the one or more users to the other condition(s) associated with the propagation information and/or condition(s) associated with respective user profile information. In some embodiments, the user selection module 205 may compare the one or more gaze metrics, interest level, and/or interest score associated with the user with the interest threshold provided by the user. In this way, users can set receiving thresholds and provide an additional level of protection against users (e.g., presenters) who might not respect sharing thresholds.

In one embodiment, the user identification module 207 may determine user preference information and/or user profile information for each of the interested users. In some embodiments, the user identification module 207 determines the UE and/or medium associated with the user provided in the user preference information to which data should be transmitted. In some embodiments, the user identification module 207 may retrieve user preference and/or user profile information associated with the user from the information management environment 111, the storage 215, the UE 101, or a combination thereof. In some embodiments, the user preference information may include an interest threshold for one or more gaze metrics. By way of example, if the user preference information for a user that includes an interest threshold for one or more gaze metrics, the user selection module 205 may determine whether the user is and/or is still considered interested based on that interest threshold.

In some embodiments, the user identification module 207 may identify a user using facial recognition software and/or another user identification (e.g., device serial number) stored in, for instance, the user preference information, user profile information associated with the user or a combination thereof. In some embodiments, the user identification module 207 may use the identified user to determine the associated user profile information In one embodiment, the propagation determination module 209 may determine propagation information associated with the object and/or the one or more entities. In some embodiments, the propagation determination module 209 may retrieve propagation information from the information management environment 111, the storage 215, the UE 101, or a combination thereof. In some embodiments, the propagation determination module 209 may process the propagation information to determine one or more conditions associated with the transmission of the data to a user and/or one or more conditions associated with propagation or further transmission of the data from the user to another user. In some embodiments, the propagation determination module 209 may process the propagation information to determine one or more interest thresholds associated with the object and/or entity.

In one embodiment, the content module 211 may store data associated with the object and/or one or more entities. In some embodiments, the content module 211 may determine content of the data based on one or more gaze metrics (e.g., interest level or interest score), the object of a user's gaze, temporal considerations or other contextual information, other condition(s) associated with the propagation information, among others, or a combination thereof. For example, the content module 211 may determine different content for a user who had different fixation durations that are above the minimum threshold. In this way, specific data corresponding to a specified amount of interest in the object of a user's gaze can be transmitted.

In one embodiment, the transmission control module 213 may control transmission of data to one or more devices determined by the user identification module 207 associated with the users considered to be interested. In some embodiments, the transmission control module 213 may add the corresponding condition(s) associated with the propagation information to the data so that further transmissions may be controlled accordingly.

In one embodiment, the transmission control module 213 may transmit and/or cause, at least in part, the transmission of the data to the one or more devices determined by the user identification module 207 using the transmission medium (e.g., text, email, pop-up alert, etc.) included in the user preference information. In some embodiments, the user device may have privacy policies that restrict receiving the transmission. For example, the privacy policies may restrict receiving transmissions from unknown devices. In one embodiment, the transmission control module 213 can change and/or cause, at least in part, the changing of the privacy policies of the user device so that the transmission may be received. For example, the transmission control module 213 may cause the transmission to be quarantined until the user may accept the received data.

In one embodiment, the data transmission determination platform 103 may store the data used or produced buy any of its components 201-213 in the storage 215, in information stores 113a-113m, on local storages of UEs 101a-101n, or a combination thereof.

Figure 3A:
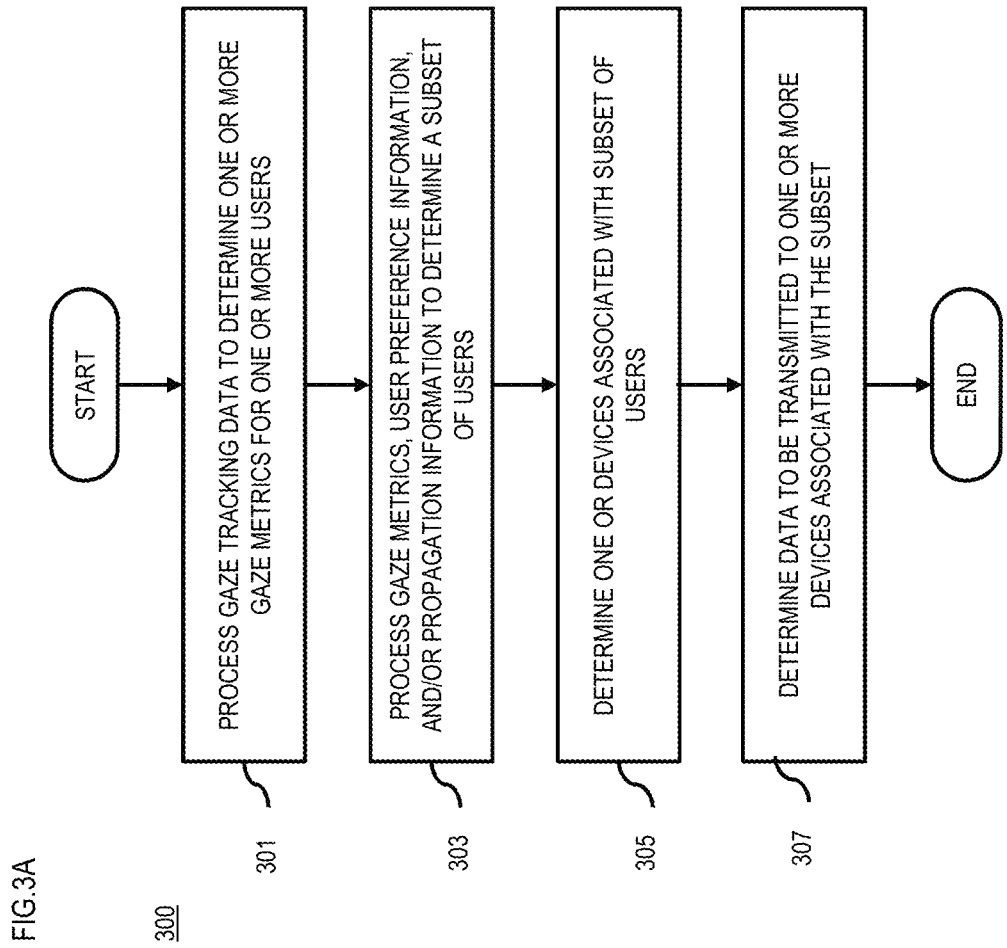
FIGS. 3A and 3B are flowcharts of processes for controlling transmission of data based on gaze interaction, according to one embodiment.
Figure 3B:
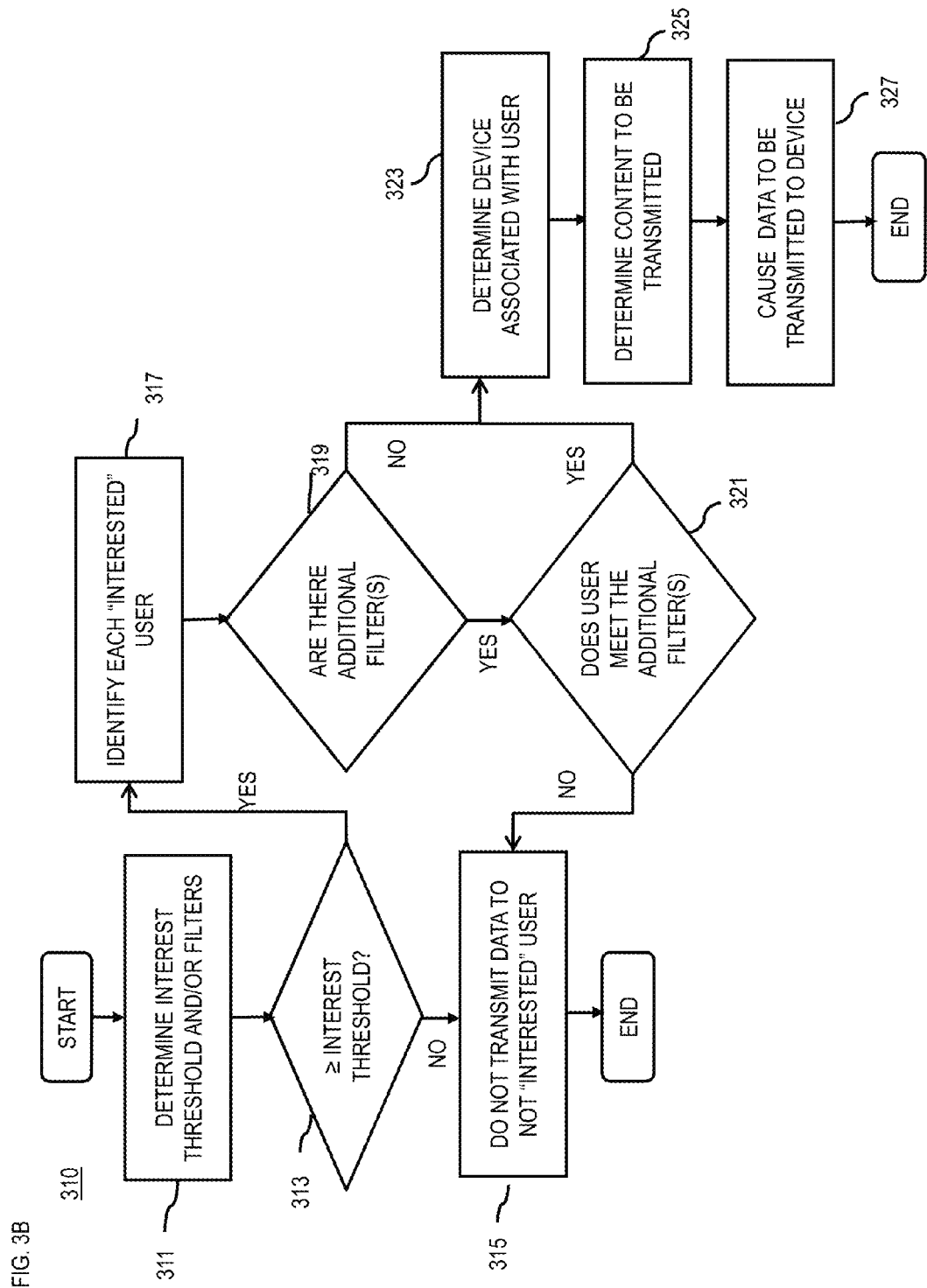
Figure 6:
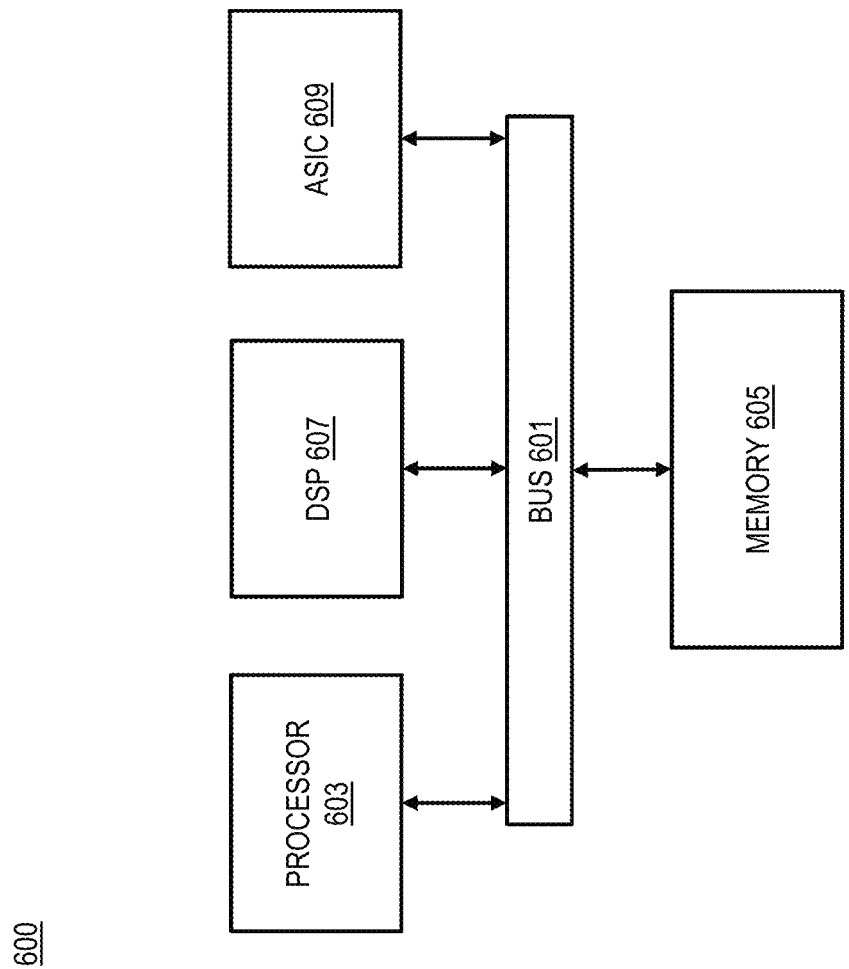
FIG. 6 is a diagram of a chip set that can be used to implement an embodiment of the invention.

FIGS. 3A and 3B are flowcharts of processes for controlling transmission of data based on gazed interaction, according to embodiments. In one embodiment, the data transmission determination platform 103 performs the processes 300 and 310 and is implemented in, for instance, a chip set including a processor and a memory as shown in FIG. 6. Throughout this process, the data transmission determination platform 103 is referred to as completing various portions of the process 300, however it is understood that the UE 101 and/or one or more of the applications 107 can perform some of and/or all of the process steps.

In step 301, the gaze metrics module 201 processes and/or facilitates a processing of gaze tracking data for one or more users acquired by one or more sensors 117. In some embodiments, for instance, for remote conferencing, the gaze metrics module 201 may also acquire contextual information from one or more sensors 117. The gaze metrics module 201 may cause, at least in part, a processing of gaze tracking data to determine one or more gaze metrics (e.g., gaze direction) for one or more users with respect to an object. In some embodiments, the gaze metrics module 201 may determine or facilitate a determining of one or more gaze metrics, such as gaze intensity, duration, frequency, among others, from the gaze tracking data. In some embodiments, the interest determination module 203 may process or facilitate a processing of the one or gaze metrics to determine an interest score or level of interest, for example, by statistically profiling the one or more gaze metrics.

By way of example, the gaze metrics module 201 may receive gaze tracking data from a sensor 117 provided on a wearable interface (e.g. glasses) worn by a presenter during a presentation at a conference. The gaze metrics module 201 may determine one or more gaze metrics for each user with respect to the presentation provided on a projection screen (e.g., the object).

In step 303, the transmission control module 213 processes and/or facilitates processing of one or more gaze metrics, user preference information determined by the user identification module 207, propagation information determined by the propagation determination module 209, or a combination thereof to determine one or more users with a specified level of interest. In one embodiment, the transmission control module 213 may compare and/or facilitate comparing the one or more gaze metrics to an interest threshold determined by the propagation information to determine a subset of one or more users with an interest level that exceeds the interest threshold. In some embodiments, the user selection module 205 may further filter and/or facilitate further filtering the subset of users using the other condition(s) included in the propagation information and/or user preference information. In this way, the user selection module 205 can further refine the subset of users based on information available regarding these users. In step 305, the user selection module may determine one or more devices associated with a subset of users, for example, using the user preference information.

In step 307, the content module 211 may determine and/or facilitate determining data to be transmitted to one or more devices associated with the subset of one or more users. In one embodiment, the data may depend on the propagation information, user preference information, user profile information, other context information, among others, or a combination thereof. In some embodiments, the data may include propagation information to further control propagation after the data is received by a user. For example, the presentation shown at the conference may be transmitted to the one or more devices of the subset of users.

FIG. 3B is a flow chart of a process for determining user devices associated with a subset of users to which the data should be caused to be transmitted based on the processed one or more gaze metrics, user preference information and/or propagation information. The process may be used to determine to one or more users for the initial transmission, to determine one or more users for further transmissions to other uses, or a combination thereof.

In step 311, the propagation determination module 209 may process and/or facilitate processing of the propagation information to determine one or more interest thresholds associated with the object and/or entity. In some embodiments, the propagation determination module 209 may process and/or facilitate processing of the propagation information to determine any additional condition(s) associated with the transmission of data. In this way, the additional condition(s) may be used as additional filters to the further refine the subset of users and/or data, for example, based on the information available about the user (e.g., user profile information).

In one use case, for an auto expo, the additional condition(s) can include income information (minimum annual income), past information (e.g., has the user received similar content in the past) and geographical information. In this way, the vendor sends information about models that only that a user can afford and purchase, and the user will receive information for models in which the user would likely be interested.

In step 313, the user selection module 205 may compare and/or facilitate comparing the one or more gaze metrics, level of interest, and/or interest score associated with each user to an interest threshold to determine "interested" users. The interest threshold may be stored in the propagation information and/or user preference information. If the one or more gaze metrics and/or interest score for a user is below the threshold, the user selection module 205 can determine or facilitate the determination that the user as not interested in the object and should not receive any data; and thus should not be included in the subset (step 315). If the one or more gaze metrics and/or interest score for a user is above the interest threshold, substantially equal to the interest threshold, or a combination thereof, the data transmission determination platform 103 determine or facilitate the determination that the user be included in the subset of interested users.

In step 317, for each user meeting and/or exceeding the interest threshold, the user identification module 207 may identify or facilitate identifying each interested user. The user identification module 207 may, for instance, identify a user using facial recognition software, the user device serial number, among others, or a combination thereof. The user identification module 207 can compare a picture of the user and/or user device serial number to, for instance, a registration database listing the attendees of the conference, employee database, among others, or a combination thereof, to identify the user. Based on the identification of the user, the user identification module 207 may determine the user preference information and/or user profile information associated with the user.

In some embodiments, the user selection module 205 may verify and/or facilitate the verifying of the one or more gaze metrics and/or interest score associated with a user determined to have met or exceed the threshold. By way of example, the user selection module 205 may have to provide proof of an "interested user" for confirmation before the user identification module 207 may access user preference and/or user profile information (step 319).

In step 319, the data transmission determination platform 103 may determine or facilitate determining whether the propagation information includes one or more additional filters (e.g., using the propagation determination module 209), the user preference information includes an interest threshold for receiving data ("receiving threshold") (e.g., using the user identification module 207), or a combination thereof. In this way, the data transmission determination platform may further refine the "interested users" and/or content of the data to be transmitted to users considered "interested."

If the propagation information and/or the user preference information do not include additional filters, then the data transmission determination platform 103 causes the process 310 to proceed to step 323.

At step 321, the user selection module 205 may compare or facilitate comparing the user to the one or more additional filters included in the propagation information and/or the user preference information. For example, if the user preference information includes a receiving interest threshold, the user selection module 205 may compare the one or more gaze metrics and/or interest score of the user to that interest threshold in step 321. If the one or more gaze metrics and/or interest score for a user is below the interest threshold, the user selection module 205 can determine or facilitate the determination that the user would not be interested in the object and should not receive any data, and thus should not be included in the subset (step 315). If the one or more gaze metrics and/or interest score for a user exceeds the interest threshold, the user selection module 205 of platform 103 can determine or facilitate the determination that the user be included in the subset of interested users. For example, the user preference may include a threshold that corresponds to a high interest score (e.g., a gaze over five seconds). In this way, the data transmission platform 103 can further refine the subset of users and identify those users that would be considered "highly interested" users, for example, based on user preference information.

For example, if the propagation information includes one or more conditions, the user selection module 205 may compare the user profile information with the one or more conditions in step 321. If the user does not meet the propagation condition(s), the user selection module 205 can determine or facilitate the determination that the user is not interested in the object and should not receive any data, and thus should not be included in the subset (step 315). If the user meets the propagation condition(s, the user selection module 205 can determine or facilitate the determination that the user be included in the subset of interested users.

In above use case, for an auto expo, the user selection module 205 may compare the income information and residence information provided in the user profile information of the user with the income information and geographical information provided in the propagation information to determine whether the data relating to car models would be relevant. If the user selection module 205 determines that the user has the minimum income level and resides in a country in which the car model is available for purchase, the user selection module 205 may determine that the user be included in the subset of interested users.

In another example, for instance, product launches, it can be important to perform a phased release of information to prevent leaks. In this case use, the filters, in addition to one or more gaze metrics, may include location information, registration and/or invitation information, etc. These filters can ensure that journalists can further propagate the shared specification to other journalists, but only to those physically present at the venue. The user selection module 205, for example, may compare the user name to the registration/invitation database and/or compare the location of the user to the location information to determine whether the user should be added to the subset of interested users.

In step 323, for one or more users considered to be part of the subset of interested users, the user identification module 207 of platform 103 may determine or facilitate the determination of one or more devices associated with each user, for example, included in the user preference information.

In step 325, the content module 211 may determine or facilitate the determination of content to transmit with the data. In one embodiment, the content may be correlated with the level of interest and/or interest score, the object of the user's gaze, temporal considerations, other contextual information, or a combination thereof.

In step 327, the transmission control module 213 may cause or facilitate the causing of data associated with the object to be transmitted to each device of each user included in the subset of interested users. In one embodiment, the transmission control module 213 may cause the data to be transmitted to the one or more users devices included in the user preference information according to the medium (e.g., text, email, etc.) included in the user preference information for that user.

In one embodiment, the data may include propagation information for further transmissions.

In some embodiments, the data may not include propagation information for further transmissions. In this use case, the receiver (user) can be prompted to set interest threshold as well as other conditions for transmitting data to other users after receiving the data.

Figure 4A:
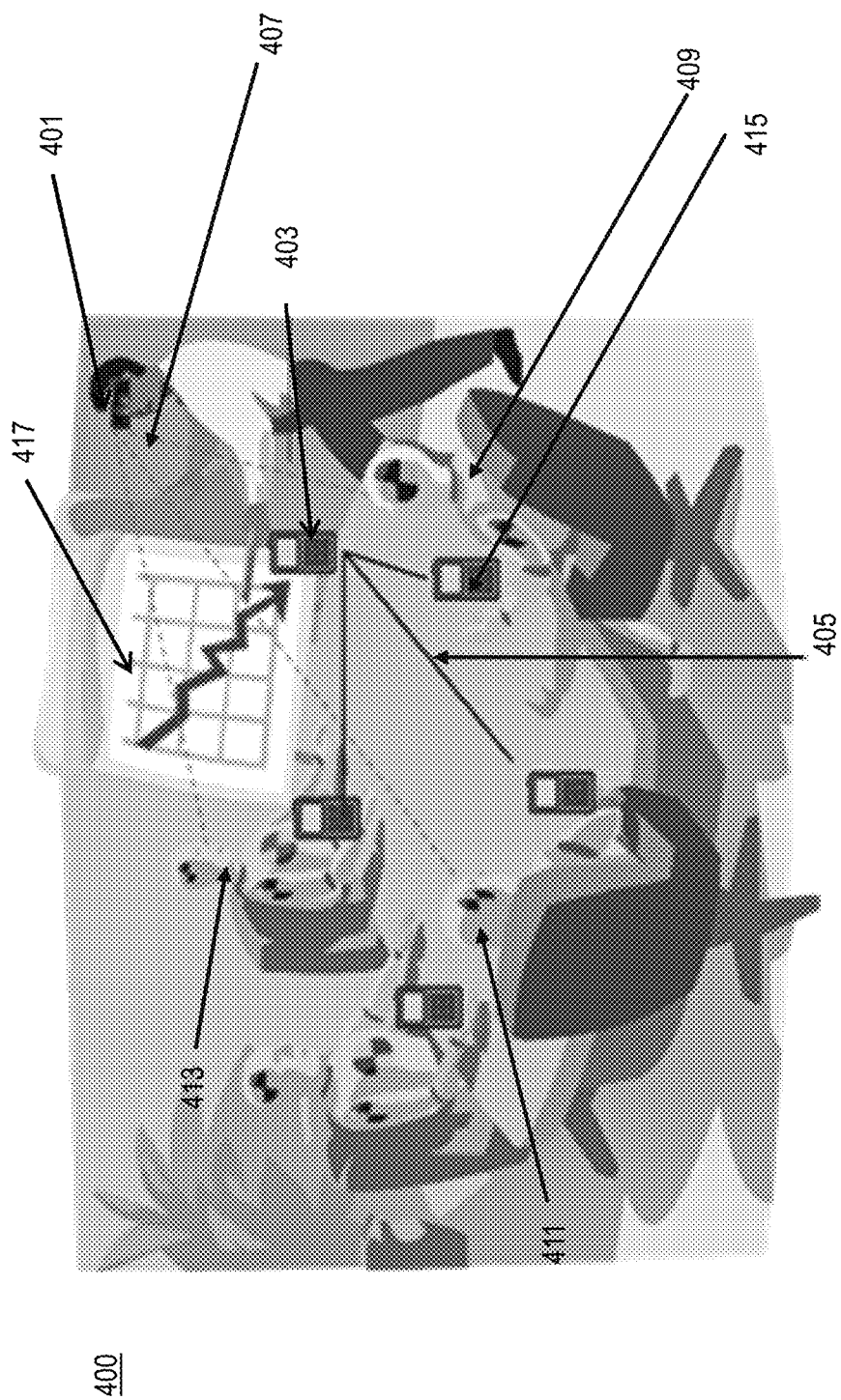
FIG. 4A is an illustration of gaze interaction processing architecture according to an embodiment.

FIG. 4A shows an exemplary system architecture according to various embodiments. As shown in FIG. 4A, the presenter is monitoring eye movement 407 of the users attending his presentation 417 using a wearable interface 401 that communicates with his device 403. In this example, the gaze metrics module 201 processes the eye movement of each user to determine one or more gaze metrics. The user selection module 205 compares the at least one or more gaze metrics for each attendee with respect to the presenter to an interest threshold to determine a subset of one or more interested users. In one embodiment, the propagation information associated with the presentation and/or presenter provides the interest threshold and the propagation determination module 209 processes the propagation information to determine any transmission conditions. In this example, the user selection module 205 determines that users 409, 411, and 413 each have a gaze metric that is above the interest threshold. The data user identification module 207 identifies each user, for example, using facial recognition software, and determines corresponding user preference information. In this example, the user identification module 207 processes the user preference information to determine preferred user devices to transmit the data and if there is any additional filters. The content module 211 processes the propagation information to determine content to be included with the data. In this example, the content is a copy of the presentation.

In this example, the user identification module 207 and the propagation determination module 209 determines that there are no additional filters for the initial transmission of data, so the transmission control module 213 causes data 405 to be transmitted from the device 403 to the user devices of associated with users 409, 411, and 413. The data 405 is transmitted with the propagation information so that further transmissions from users 409, 411, and 413 can be controlled. In this example, the users 409, 411, and 413, may transmit to any user having a gaze metric excess of a gaze threshold (equivalent to gaze contact) and employed by the same company as users 409, 411, and 413.

Figure 4B:
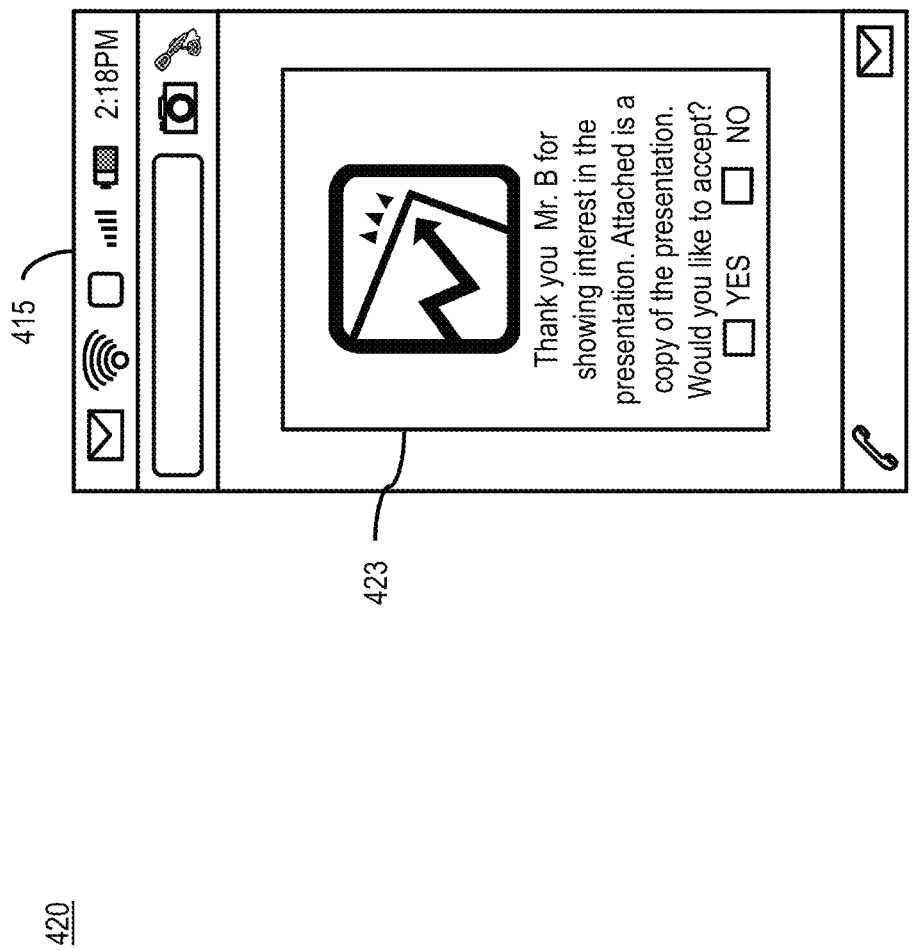
FIGS. 4B and 4C are diagrams of user interfaces utilized in the processes of FIG. 3, according to various embodiments.
Figure 4C:
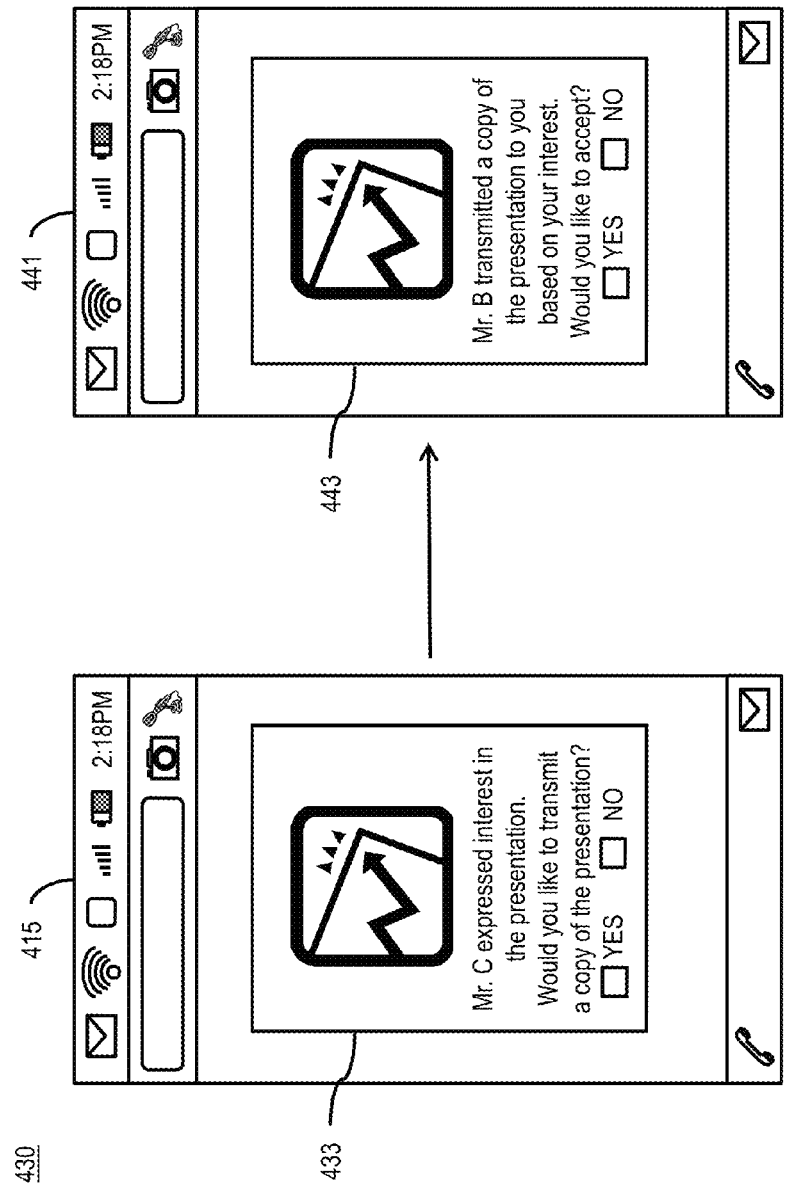

FIGS. 4B and 4C are diagrams of user interfaces utilized in the processes of FIG. 3, according to various embodiments. FIG. 4B shows the data transmitted to device 415 associated with the user 409. In this example, the data 405 transmitted to the device 415 includes a copy of the presentation 417 shown in FIG. 4A. The data may be transmitted in any medium, such as email, text, pop-up alert, among others, or a combination thereof, and is not limited to the pop-up shown. In one embodiment, the interface 423 provides user 409 with an option to accept the received data. In this scenario, the transmission control module 213 determined that the privacy policies associated with device 415 prohibits receipt of data from unknown sources and the transmission control module 213 caused the privacy policies to change to quarantine the pop-up until the user accepts the received data. User 409 accepted the data 405 and the corresponding propagation information.

FIG. 4C shows an interface in which the data transmission determination platform 103 has determined a user that meets the one or more conditions associated with the propagation information and with which user 409 has come in contact. In this example, user 409 is alerted that another user (Mr. C) meets the one or more conditions, e.g., made sufficient eye contact and is an employee of the same company as 409. In one embodiment, user 409 can be prompted to authorize transmission of the data (presentation) to another user, as shown in interface 433. After the user 409 accepts, the data transmission control platform 103 can cause the data 405 to be transmitted to user device 441 associated with Mr. C. Like user 409, the interface 443 provides Mr. C with an option to accept the received data.

The processes described herein for controlling transmission of data based on gaze interaction may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
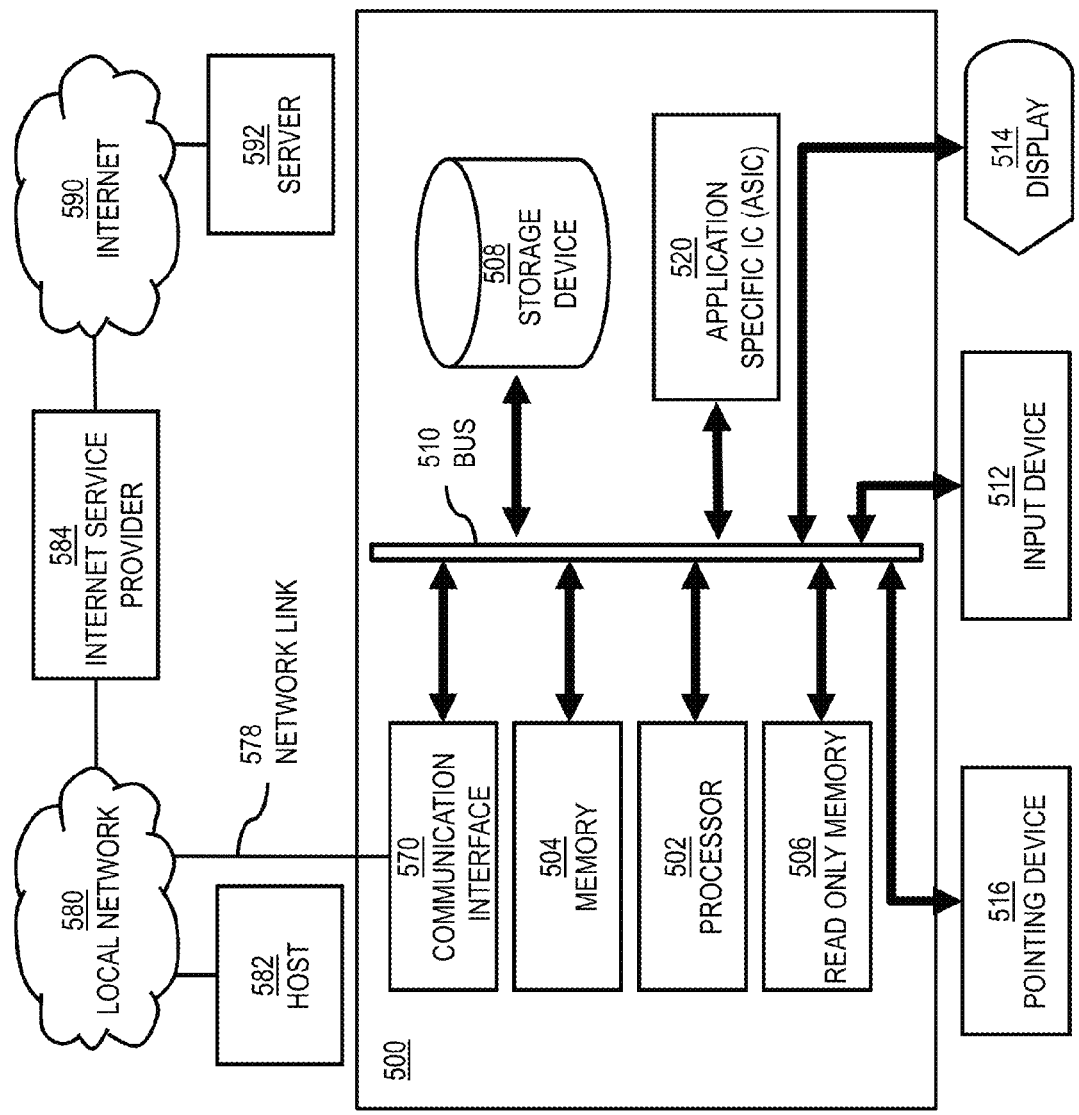
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to control transmission of data based on gaze interaction as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of controlling transmission of data based on gaze interaction.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to controlling transmission of data based on gaze interaction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for controlling transmission of data based on gaze interaction. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for controlling transmission of data based on gaze interaction, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for controlling transmission of data based on gaze interaction to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to control transmission of data based on gaze interaction as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of control transmission of data based on gaze interaction.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to control transmission of data based on gaze interaction. The memory 605 also stores the data associated with or generated by the execution of the inventive steps.

Figure 7:
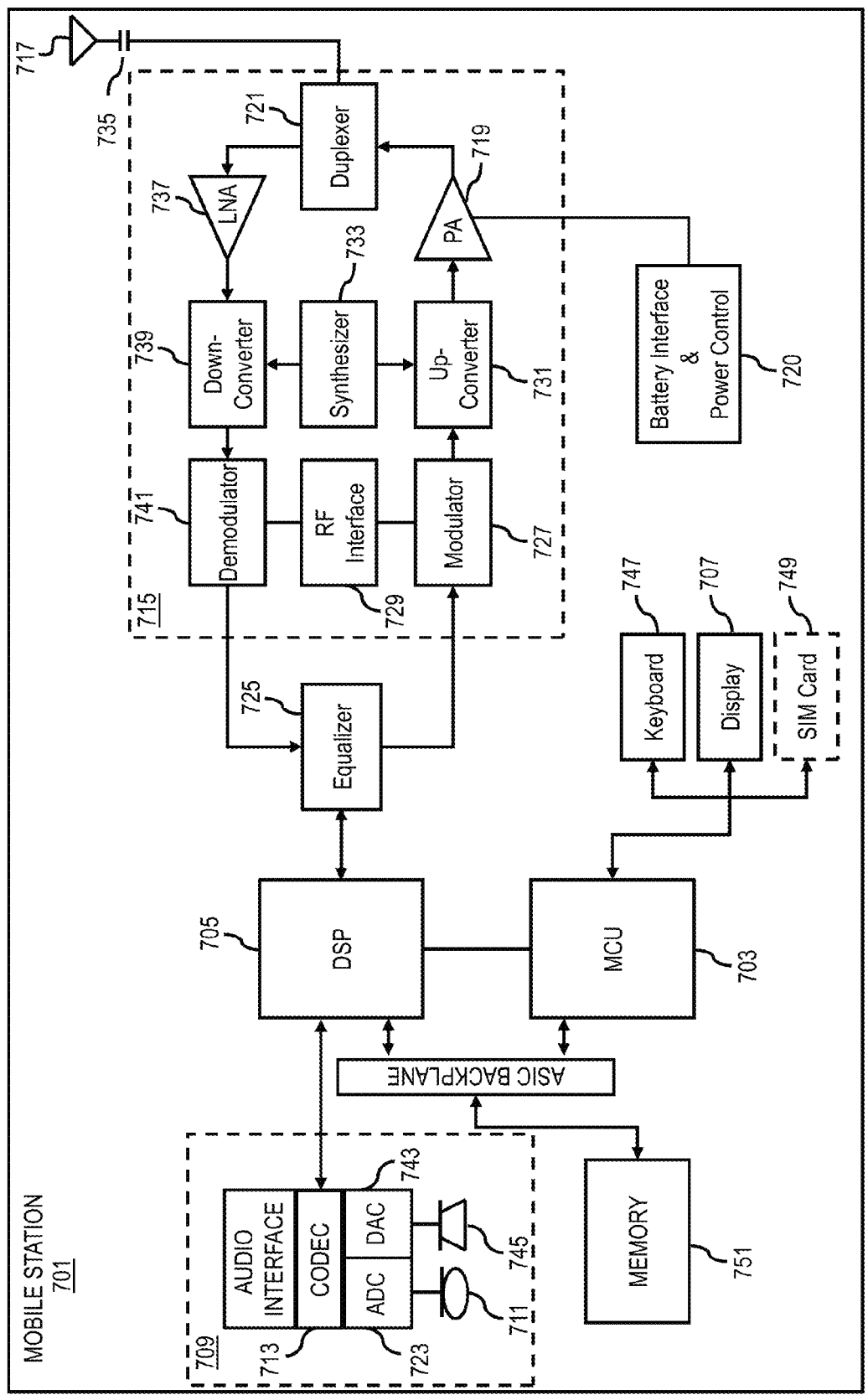
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of controlling transmission of data based on gaze interaction. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of controlling transmission of data based on gaze interaction. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to control transmission of data based on gaze interaction. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving gaze tracking information pertaining to one or more users from a camera;
   determining from the gaze tracking information one or more gaze metrics for the one or more users, wherein the one or more gaze metrics, relate to a level of interaction of each user with an object;
   processing one or more of the gaze metrics, user preference information, and propagation information from one or more entities associated with the object to determine data to transmit to one or more devices associated with at least a subset of the at least one or more users;
   determining a first interest threshold and a second interest threshold, greater than the first threshold, for the one or more gaze metrics,
   wherein the first interest threshold is set by a provider of the data to be transmitted and the second interest threshold is set by each of the one or more users;
   evaluating the one or more gaze metrics for said each of the one or more users against the first and second interest thresholds to determine whether to cause a transmission of the data to one or more devices,
   wherein the data is transmitted to the one or more devices of said each of the one or more users only when the first and second interest thresholds are exceeded, and
   wherein the one or more gaze metrics include one or more of gaze intensity, duration, and frequency;
   identifying each user of the subset;
   determining the user preference information associated with each user of the subset based on the identification; and
   processing the user preference information to determine a device associated with each user of the subset to transmit the data.

2. A method of claim 1, further comprising:
   monitoring at least one gaze of the one or more users with respect to the object; and
   processing the at least one gaze to determine the one or more gaze metrics.

3. A method of claim 1, further comprising:
   processing the propagation information to determine one or more of one or more conditions associated with propagating the data to a user, the one or more conditions include conditions associated with location information, user profile information, registration information, and one or more gaze metrics.

4. A method of claim 1, further comprising:
   determining a position of the one or more users at least relative to the object; and
   processing the position to determine the one or more gaze metrics for the one or more users.

5. A method of claim 1, further comprising:
   selecting the subset of the one or more users based on one or more of at least one interest score, user preference information, and propagation information from one or more entities associated with the object.

6. A method of claim 1, further comprising:
   a processing of the one or more gaze metrics to determine at least one interest score for each user,
   wherein a transmission of the data is based on the at least one interest score.

7. An apparatus comprising:
   at least one processor; and
   at least one memory including computer code for one or more programs,
   the at least one memory and the computer program code configured to, with the at least one processor, cause the apparatus to perform at least the following:
   receive gaze tracking information pertaining to one or more users from a camera;
   determine from the gaze tracking information one or more gaze metrics for the one or more users, wherein the one or more gaze metrics, relate to a level of interaction of each user with an object;
   process one or more of the one or more gaze metrics, user preference information, and propagation information from one or more entities associated with the object to determine data to transmit one or more devices associated with at least a subset of the at least one or more users;
   determine a first interest threshold and a second interest threshold, greater than the first threshold, for the one or more gaze metrics,
   wherein the first interest threshold is set by a provider of the data to be transmitted and the second interest threshold is set by each of the one or more users;
   evaluate the one or more gaze metrics for said each of the one or more users against the first and second interest thresholds to determine whether to cause a transmission of the data to one or more devices,
   wherein the data is transmitted to the one or more devices of said each of the one or more users only when the first and second interest thresholds are exceeded, and
   wherein the one or more gaze metrics include one or more of gaze intensity, duration, and frequency;
   cause an identification of each user of the subset;
   determine the user preference information associated with each user of the subset based on the identification; and
   process the user preference information to determine a device associated with each user of the subset to transmit the data.

8. An apparatus of claim 7, wherein the apparatus is further caused to:
   cause a monitoring of at least one gaze of the one or more users with respect to the object; and
   process the at least one gaze to determine the one or more gaze metrics.

9. An apparatus of claim 7, wherein the apparatus is further caused to:
   process the propagation information to determine one or more conditions associated with propagating the data to a user, the one or more conditions include one or more of conditions associated with location information, user profile information, registration information, and one or more gaze metrics.

10. An apparatus of claim 7, wherein the apparatus is further caused to:
- determine of a position of the one or more users at least relative to the object; and
- process the position to determine the one or more gaze metrics for the one or more users.

11. An apparatus of claim 7, wherein the apparatus is further caused to:
- cause a selection of the subset of the one or more users based on one or more of at least one interest score, user preference information, and propagation information from one or more entities associated with the object.

12. An apparatus of claim 7, wherein the apparatus is further caused to:
- process the one or more gaze metrics to determine at least one interest score for each user,
- wherein a transmission of the data is based on the at least one interest score.

* * * * *